United States Patent [19]
Davis et al.

[11] Patent Number: 4,899,366
[45] Date of Patent: Feb. 6, 1990

[54] TAP ROTATION N FRACTIONALLY SPACED EQUALIZER TO COMPENSATE FOR DRIFT DUE TO FIXED SAMPLE RATE

[75] Inventors: Gordon T. Davis; Baiju D. Mandalia, both of Boca Raton, Fla.

[73] Assignee: International Business Machines Corporation, Armonk, N.Y.

[21] Appl. No.: 227,582

[22] Filed: Aug. 2, 1988

[51] Int. Cl.$^4$ .............................................. H04B 3/06
[52] U.S. Cl. ...................................... 375/14; 333/18
[58] Field of Search ................... 375/12, 14, 106, 118, 375/119; 333/18; 364/724.2

[56] References Cited

U.S. PATENT DOCUMENTS

| | | | |
|---|---|---|---|
| 3,508,153 | 4/1970 | Gerrish et al. | 375/16 |
| 3,694,752 | 9/1972 | Gibson | 375/14 |
| 3,697,689 | 10/1972 | Gibson | 375/14 |
| 3,868,603 | 2/1975 | Guidoux | 333/18 |
| 4,145,747 | 3/1979 | Sakaki et al. | 364/724 |
| 4,146,840 | 3/1979 | McRae et al. | 375/12 |
| 4,285,061 | 8/1981 | Ho | 375/15 |
| 4,343,759 | 8/1982 | Kustka et al. | 375/14 |
| 4,384,355 | 5/1983 | Werner | 375/14 |
| 4,550,415 | 10/1985 | Debus, Jr. et al. | 375/14 |

OTHER PUBLICATIONS

G. Ungerboek, "Fractional Tap-Spacing Equalizers and Consequences for Clock recovery in Data Modems", IEEE Trans. on Communications, vol. Com. 24, No. 8, Aug. 1976, pp. 856-864.
Cowan, C. F. N., Grant, P. M., "Adaptive Filters", Prentice-Hall Inc., 1985.
Rabiner, L. R., Gold, B., "Theory and Application of Digital Signal Processing", Prentice-Hall, 1975.
Hartman, P., Bynam, B., "Adaptive Equalization for Digital Microwave Radio Systems", IEEE International Conference on Communications, Paper 8.5, 1980.
Taylor, N. G., "Adaptive Antennas", Special Issue, Proceeding of IEE, vol. 130, No. 1, pp. 1 55, Jan. 1983.
Makhoul, J., Vishwanathan, R., "Adaptive Lattice Methods for Linear Prediction", Proceedings of ICASSP 1978, pp. 83–86.
Holt, L., Stueflotten, S., "A New Digital Echo Canceler for Two Wire Subscriber Lines", IEEE Trans. COM-29, No. 11, pp. 1573-1581, Nov. 1981.
Haykin, S., Cadzov, J. A., "Spectral Estimation", Special Issue, Proceeding of IEE, vol. 70, No. 9, Sep. 1982.
Ungerboeck, G., "Adaptive Equalization Techniques in Voiceband Data Transmission", Proceedings of Intl Conf on Communicatoins, Jun. 1980, pp. 8.4.1–8.4.6.
P. Thomas, "The Design and Implementation of a CCITT V.32 Modem on a General Purpose Digital Signal Processing Microprocessor", Proceedings of the IEEE International Conf. on Communications, 1987, pp. 12.5.1 to 12.5.4.
Desblache et al, IBM Technical Disclosure Bulletin, v. 21, No. 5, Oct. 1978, at pp. 1916-1918.

*Primary Examiner*—Benedict V. Safourek
*Attorney, Agent, or Firm*—Robert Lieber; Joseph T. Downey

[57] ABSTRACT

In a modem receiver having a fixed sample rate relative to incoming symbols and a tapped delay adaptive equalizer with fractional tap spacing, coefficients used in the equalization computations are rotated relative to a reference tap in order to compensate for relative drift between incoming signals, representing real (i.e. non-training) data, and the clock controlling sampling. By itself, such rotation would tend to distort received data by shifting the sampling phase away from the center of the received symbols. Logic means included herewith operates to prevent such distortion, so that the integrity of the data output of the receiver is unaffected by the rotation. In the disclosed embodiment, such logic means operates to shift the phase of the "sum of products" computation (product of data and tap coefficients) relative to the flow of data into the fractionally spaced delay network. Since the present receiver does not require synchronization with incoming symbols it is well adapted to function in environments where such synchronization would be difficult to provide; for example, in situations where data transmitted at various baud rates is received via a digital carrier trunk and requires equalization or comparable filter processing.

9 Claims, 4 Drawing Sheets

Each "Pi" Passes Larger of Its 2 Inputs

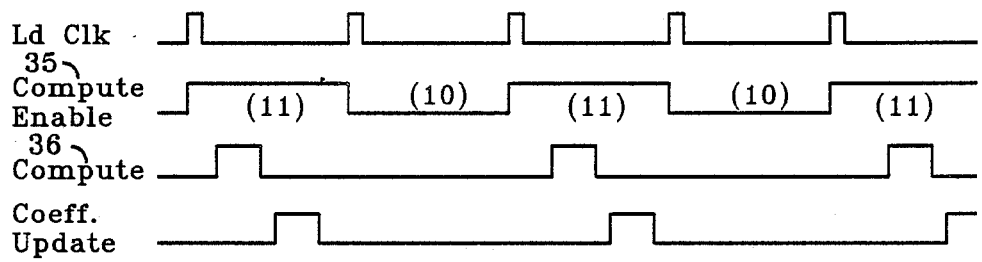
FIG. 4A (No Shift)
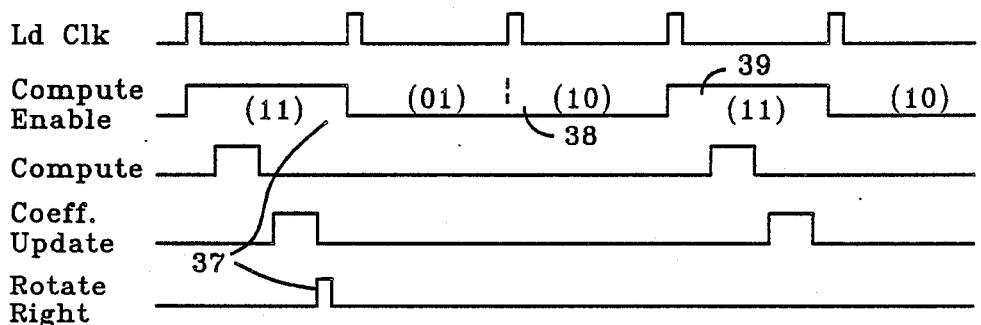
FIG. 4B (Rotate Right)
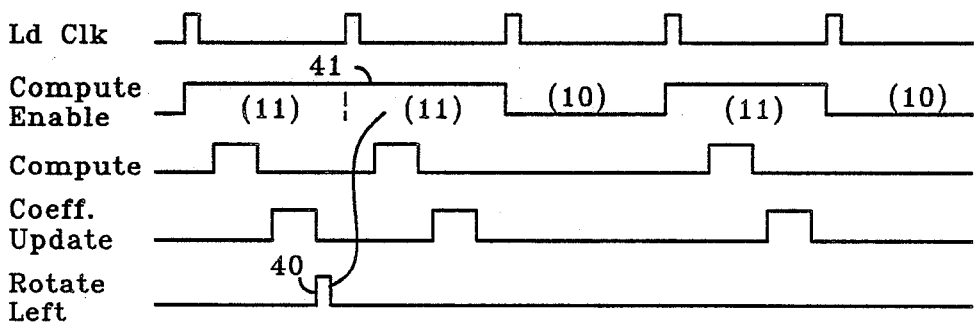
FIG. 4C (Rotate Left)

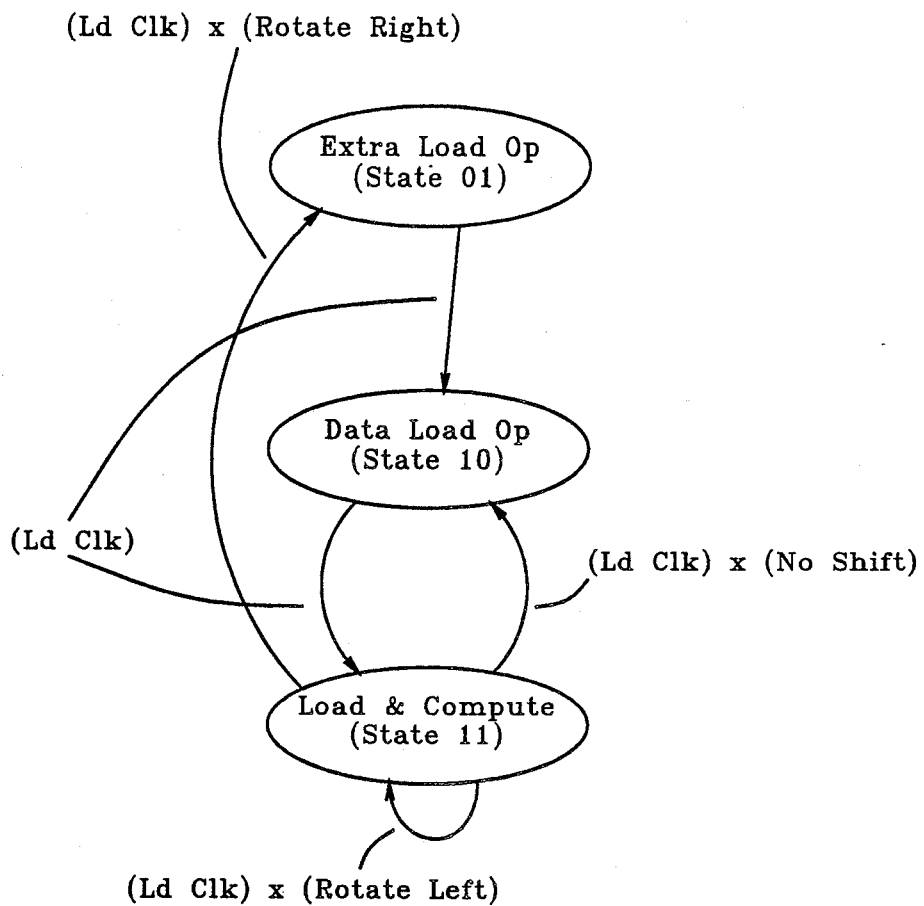
FIG. 5 (State Diagram)

TAP ROTATION N FRACTIONALLY SPACED EQUALIZER TO COMPENSATE FOR DRIFT DUE TO FIXED SAMPLE RATE

RELATED PATENT APPLICATIONS

Pat. Appl. Ser. No. 227832, by G. T. Davis et al, filed on the same date as this application, and entitled "Real-time Digital Signal Processing Relative to Multiple Digital Communication Channels, discloses a digital signal processing system for providing all-digital modem transformations of data between remote users of the public telephone network and a data processing center, via a time divided digital carrier trunk. Such systems are required to exchange data at the trunk interface in a form representing quantized samples of analog waveforms generated by diverse user equipment and to exchange data with the processing center in a form directly representing data characters or symbols. The receiver section of that system preferably applies fractionally spaced equalization to data signals extracted from channels of the digital trunk at a fixed rate, and corrects for drift between the transmitted baud rate and local oscillations by a combination of tap rotation and adjustments in computation in accordance with the present invention,

BACKGROUND OF THE INVENTION

The Problem

Known adaptive equalizers with fractional tap spacing—reference: (1) G. Ungerboeck, "Fractional Tap-Spacing Equalizers And Consequences For Clock Recovery In Data Modems", IEEE Trans. On Communications, Vol. Com. 24 No. 8, August, 1976, Pages 856–864; (2) U.S. Pat. No. 4,343,759—employ a training process preceding real data transmission to establish an optimized ensemble of tap coefficients, with optimum tap positioning. After training, tap positions of such coefficients are held fixed while non-training data symbols are received. In this mode, coefficient magnitudes are adjusted slightly after each symbol is received in order to minimize the mean squared error in equalizer output relative to an ideal symbol level. Sample timing is also adjusted during post-training reception in order to maintain synchronism between the sampling process and the transmission source, and thereby minimize errors in reception processing.

Adjustable sample timing requires use of variable oscillators which are relatively costly, particularly for high baud rate transmissions. Furthermore, there are communication situations in which adjustable sample timing would be very difficult to accomplish (refer to the above cross-referenced copending application by Davis et al). A more efficacious scheme is presented presently.

SUMMARY OF THE INVENTION

The present invention concerns fractional tap-spacing equalization of data signals sampled at fixed rates. In particular, it concerns a system which expects to have continuous slow drift between a local source of sample timing and symbols received after training.

To compensate for such expected drift, the equalization coefficients are periodically monitored and rotated by fractional tap distances to correct for perceived deviations.

By itself such rotation would shift the phase of the sum of products computation associated with equalization so as to introduce undesired errors in the equalized data. To prevent this, computation operations following each rotation are adjustably retimed, relative to the flow of new data samples into the computation network, so as to minimize the distortional effects associated with the rotation.

Right and left tap rotations create different distortional effects, in recognition of which different adjustments in relative computation phase are introduced presently. Computation following a right rotation/shift is retarded in phase, while computation following a left rotation/shift is advanced in phase.

These and other features, advantages, objectives and benefits of the present invention will be more fully understood from the following description and claims.

Additional References

Additional references of interest presently include:

(3) Cowan C. F. N., Grant P. M., "Adaptive Filters", Prentice-Hall Inc., 1985

(4) Rabiner L. R., Gold B., "Theory And Application of Digital Signal Processing", Prentice-Hall, 1975

(5) Hartman P., Bynam B., "Adaptive Equalization For Digital Microwave Radio Systems", IEEE International Conference on Communications, Paper 8.5, 1980

(6) Taylor N. G., "Adaptive Antennas", Special Issue, Proceeding of IEE Vol 130 No 1, Pp 1–55, Jan. 1983

(7) Makhoul J., Vishwanathan, R., "Adaptive Lattice Methods For Linear Prediction", proceedings of ICASSP 1978, Pp 83–86

(8) Holt L., Stueflotten S., "A New Digital Echo Canceler For Two Wire Subscriber Lines", IEEE Trans. COM-29, No 11, Pp 1573–1581, November 1981

(9) Haykin S., Cadzov J. A., "Spectral Estimation", Special Issue, Proceeding of IEE, Vol 70, No 9, September 1982

(10) Ungerboeck G., "Adaptive Equalization Techniques In Voice-band Data Transmission", Proceedings of Intl Conf on Communications, June 1980m Pp 8.4.1–8.4.6.

References to Taylor (6) and Makhoul (7) may be redundant since this material is covered by and acknowledged in Cowan (3). The cited references show generally adaptive estimation (equalization) and, more specifically, their application in various technological areas.

DRAWINGS

FIGS. 4A–4C are diagrams illustrating timing of equalization computation operations for respective coefficient tap rotation cases of: no rotation, right rotation, left rotation.

FIG. 5 is a state diagram illustrating the states of the logic shown in FIG. 3 as required to provide the effects indicated in FIGS. 4A–4C.

DETAILED DESCRIPTION

Referring to FIG. 1, crystal controlled oscillator 1A in combination with timing circuits 2 provides various fixed rate clocks 3-5, including a sample loading clock 4 ("Ld Clk") associated with the subject adaptive equalization process.

Figure 1A:
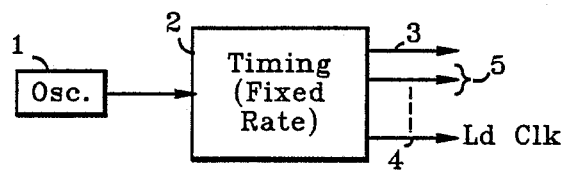
FIGS. 1A–1D are a schematic of an adaptive equalizer section of a modem embodying the present invention.
Figure 1B:
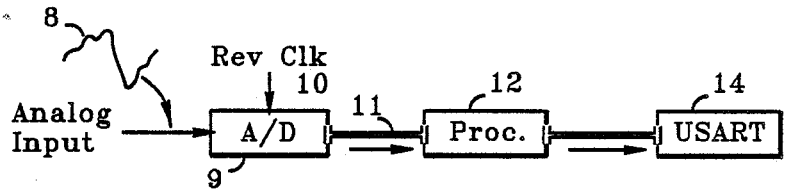
Figure 1C:
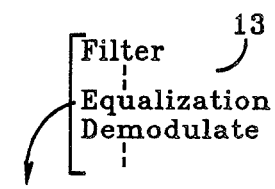

In FIG. 1B data signals 8 in analog form are sampled in A/D (analog to digital conversion) circuit 9 by fixed rate receive clocking ("Rcv Clk") signals transferred from output 3 of timing circuits 2 to control input 10 of circuits 9. Outputs 11 of circuits 9, representing quantized amplitude samples, are applied to processing circuits 12 which may be implemented by a microprogrammed digital data processor (refer to above-referenced copending application by Davis et al). Circuits 12 perform various processes on the data samples—including digital filtering, equalization, demodulation, etc. as suggested in FIG. 1C at 13—to extract digital data which directly represents transmitted characters or other symbols. Signals representing such data can be transferred to digital computer systems, for processing of the data intelligence, via USART (Universal Synchronous-Asynchronous Receive Transmit) circuits shown at 14. Of particular interest presently, is the equalization process.

In FIG. 10 the functional elements for implementing this equalization process within the circuit block 12, indicated generally at 15, comprise data delay network 16, compute network 17, and coefficient shift/rotate network 18. Data samples staged in network 16 are applied to compute network 17 for multiplication by correspondingly positioned coefficients in network 18. The multiplication products are summed to produce output samples $Y_n$. A slicer element (not shown) makes decisions as to what deviation from ideal symbol level is represented by the magnitude of $Y_n$, and coefficient values are updated if necessary to correct for such deviation. Updated coefficients are calculated to minimize the mean squared error of $Y_n$ relative to the ideal symbol level in accordance with prior art (see e.g. references 1 and 2 above).

After each $Y_n$ calculation, data in network 16 is shifted to the right two positions while new data samples are shifted through gate circuits 19 into the vacated (two leftmost) positions in network 16. Loading is under control of Ld Clk signals transferred from timer port 4 (FIG. 1A) to gating control input 20.

Values of coefficients in circuits 18, and their relative tap positions, are determined initially by a conventional training procedure not part of the present invention. Typically, the most significant coefficients determined by the training process are positioned at or within one tap space of a reference tap position which may be a middle or center tap (see U.S. Pat. No. 4,343,759 mentioned above). In the operations to be described next, it is assumed that the most significant coefficients are positioned symmetrically about a center tap, and that real (non-training) data is being received and preprocessed to provide the filtered digital data samples appearing at 19.

After each sum of products ($Y_n$) computation and coefficient update, the coefficients in circuits 18 are monitored by circuits 21 to detect shifts in positioning of the most significant coefficients relative to the reference/center tap. Since transmitted symbols and Ld Clk are both timed by crystal controlled oscillations, such shifts occur very gradually, so that it should be understood that a drift of one tap space to the left or right of center, and for that matter a change in coefficient magnitudes sufficient to require updating action, would occur only after many cycles of $Y_n$ computations. Shifts in optimal coefficient positioning are corrected in accordance with the present invention by applying compensational right or left shifts to realign the most significant coefficients with the reference/center tap.

Such realigning shifts may be rotations, in the sense of having the leftmost coefficient shifted into the rightmost position after a left shift or the rightmost coefficient into the leftmost position after a right shift. Alternatively, if the coefficient magnitudes at the extremes are very small, zero values may be shifted into vacated extreme positions. Accordingly, as circuits 21 detect misalignment of coefficients to the left of the center tap a "rotate right" control signal is provided at 22, causing the coefficients in circuits 18 to shift right by one tap position. Conversely, if misalignment of coefficients to the right is detected, a "rotate left" control signal is issued at 23 causing the coefficients to shift left by one tap position. If the coefficients are properly aligned, a "no shift" control signal issues at 24.

Outputs of circuits 21 are applied to logic circuits 25 which determine the timing of equalization computation operations in a manner to be described. Only the "Rotate Right" and "No Shift" outputs are used explicitly in this determination, but the "Rotate Left" signal may be considered as used implicitly since an associated determination is based on the absence of both "Rotate Right" and "No Shift" which invariably coincides with occurrence of "Rotate Left". The "compute enable" output 26 of circuits 25 is applied to input 27 of compute circuit 17 for controlling individual sum of product computing cycles of the latter.

Figure 2:
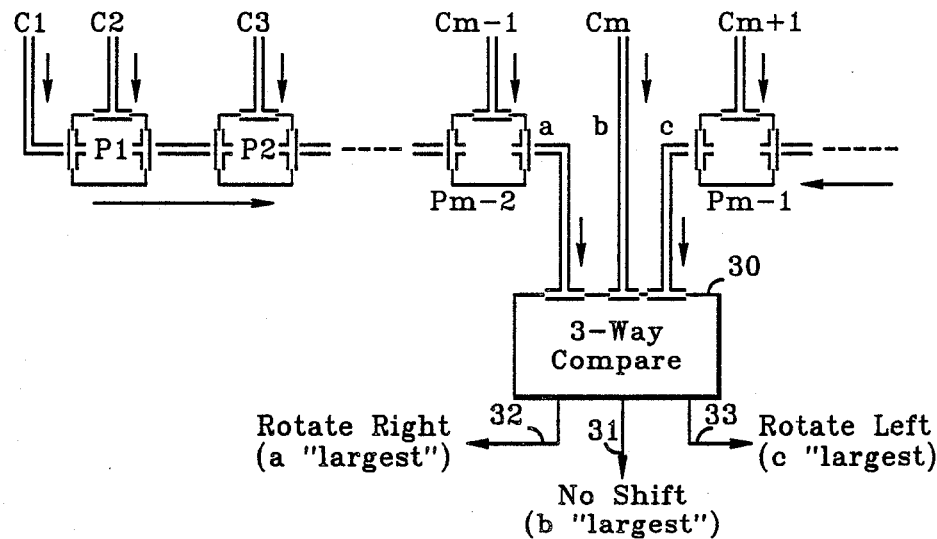
FIG. 2 is a schematic illustration of details of the coefficient monitoring logic shown in FIG. 1.

Referring to FIG. 2, the logic in circuits 21 for determining off-center misalignment of coefficients comprises circuits P1, P2,..., Pm,.. for comparing pairs of magnitudes and passing the greater of the pair as output to the next circuit. P1 receives leftmost coefficients C1 and C2, P2 receives the output of P1 (the larger of C1 and C2) and C3, and so forth. P1 through Pm−2 receive the coefficients to the left of the center tap and Pm−1, Pm, Pm+1, etc., receive the coefficients to the right of center. Circuits 30 provide a 3-way comparison of the coefficient magnitudes a, b and c respectively representing the output of Pm−2, Cm and the output of Pm−1.

If the coefficients are properly centered, Cm should be larger than all coefficients to the left and right (i.e. b should be greater than a and also greater than c), and "no shift" output 31 of circuits 30 will be activated to indicate that no coefficient tap rotation is needed. However, if the coefficient magnitudes are off center to the left, a will be greater than b and c, and "rotate right" output 32 of circuits 30 will be activated to indicate need for a corrective tap rotation one unit tap distance to the right. Similarly, if the misalignment is right of center, c will be greater than b and a, and output 33 ("rotate left") will be activated to indicate need for corrective rotation one tap unit to the left. Once properly centered, the coefficients could be maintained just by monitoring the three central coefficients $C_{m-1}$, $C_m$ and $C_{m+1}$. Thus, monitoring logic 21 may be reduced to just the compare circuit 30 during non-training operations under normal conditions.

Figure 1D:
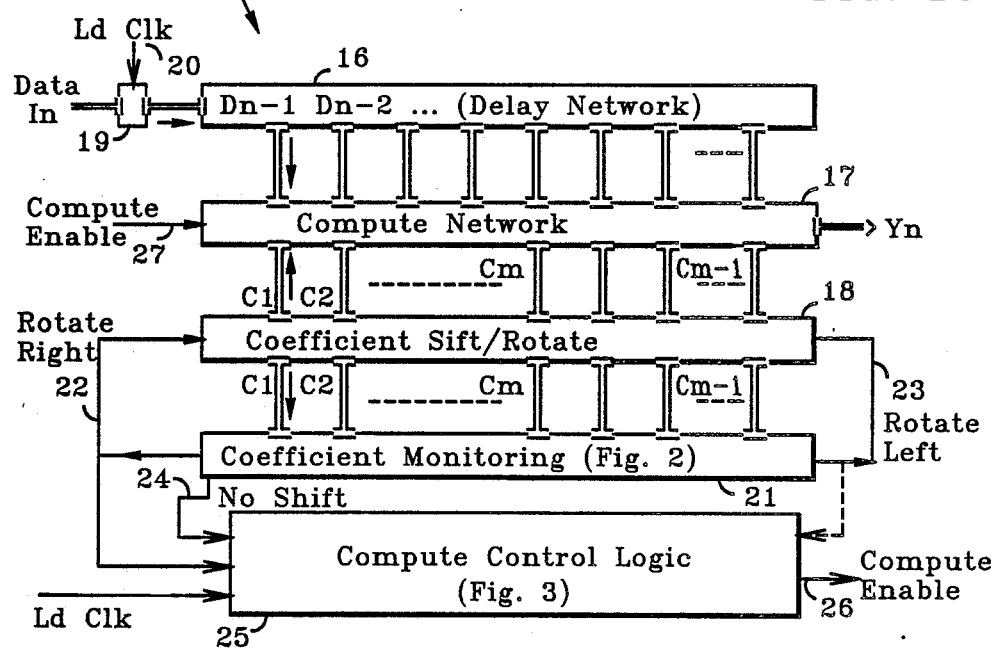

Such tap rotations without further action would introduce distortions into the sum of products computation which can best be understood by considering the timing diagram of FIG. 4A, depicting the relative timing of new data loading into network 16 of FIG. 1D and sum of product computation operations in circuits 17 of FIG. 1 when coefficients are properly aligned relative to the center tap position. In this situation, for each two new data shifts into the network (2 Ld Clk pulses), one computation is performed under control of compute enable and compute control signals shown at 35 and 36 respectively. This of course is premised on a tap spacing of T/2 where T is the baud spacing of two consecutively transmitted symbols, and it is understood that other spacings would require different ratios of loading to compute action cycles.

Now consider what occurs when a rotate right operation is executed by examining FIG. 4B. A rotate right decision is made towards the end of a period in which "compute enable" is active or high as suggested at 37, and suppose that the next active state of "compute enable" were permitted to occur in its normal phase position 38. In this circumstance, the computation would occur after the coefficients had shifted right by one tap space and the data had shifted right by two spaces, so that in effect the data used in this computation would be displaced only one position to the right of the position it had relative to the coefficients at the time of the previous computation. The resultant equalizer output would be generated at a point midway between the previous symbol peak at 37 and the next symbol peak (symbol peaks occur at the baud rate; in this example, once every two shifts of data relative to the coefficients). Typically, the equalizer output if calculated between peaks would be at a null or low transitional level, with erroneous or unpredictable consequences.

Accordingly, as shown at 38 and 39 this can be avoided by delaying the next compute enable by one load period; i.e. by effectively allowing the data to shift right by 3 spaces after the coefficients have shifted right by one space, whereby the relative displacement of data to coefficients at the next computation is the normal one of two shifts right.

Consider similarly what would occur after a left tap rotation uncorrected by referring to FIG. 4C. After such a rotation, instigated at time 40, the data would have advanced one tap to the right while the coefficients would have been shifted one position to the left so that relative to the coefficients the data would immediately be displaced two positions to the right whereby data and coefficients would be immediately in proper relative position for the next computation in the present natural order of two loads per computation. Thus, in this situation, the computation is advanced to immediately follow the preceding computation, by advancing the next compute enable as suggested at 41, thereby avoiding the loss of data which would result if the computation were not advanced and an additional data load was allowed to occur before the computation.

Shifts of coefficients by more than one tap position, if needed, could be accommodated by extensions of the foregoing techniques. Thus, for each right shift by one position compute enable would be retarded by one load period and for each left shift by one position compute enable would be advanced by one load period.

Figure 3:
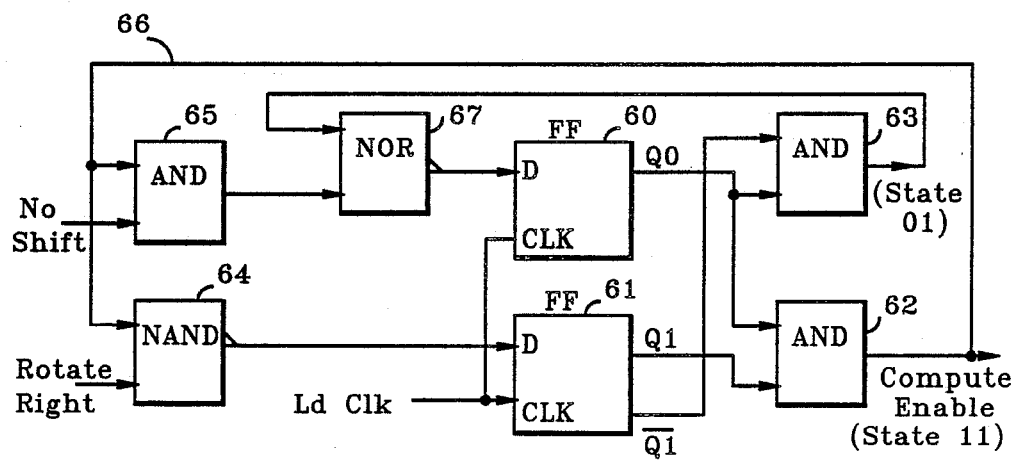
FIG. 3 is a diagram illustrating the present logic for adjusting the relative timing of equalization computations to correct for distortional effects of tap rotation.

Logic for retarding compute enable after right tap rotation and advancing it after left rotation is shown in FIG. 3, and a state diagram characterizing its sequence of operational states is shown in FIG. 5. Note that although discrete logical elements (And, Or and Flip-Flop Circuits) are shown here for clarity, the functions performed for generation of compute enable—as well as those performed for Yn computation, coefficient monitoring/updating/rotation, etc.—can be performed more efficiently by a microprocessor operating under microprogram direction.

Referring to FIG. 3, Ld Clk is applied to "clock" inputs of D-type flip flops 60 and 61, causing each flip flop to transfer the state of its D input to its respective output (Q0 for 60, Q1 for 61). States transferred depend on states present at And circuits 62 and 63, Nand Circuit 64, And circuit 65 and Nor circuit 67. When Q0 and Q1 are both active "compute enable" output of And 62 is active. With "compute enable" active, circuits 64 and 65 are prepared via line 66. If no tap rotation is required when the current Yn computation concludes, "no shift" input to circuit 65 is active, completing enablement of that circuit and passing a disabling condition to flip flop 60, via Nor 67, so that at next Ld Clk time Q0 drops. This disables And 62 causing "compute enable" to fall and preventing further computation. It also disables And 65 causing output of Nor 67 to rise, and partially prepares Nand 64 causing its output to rise (since "Rotate Right" is also inactive at this time. This prepares D inputs of both Flip-Flops 60 and 61 so that both Q0 and Q1 are reactivated at next Ld Clk. Thus, "compute enable" is generated on the second of two Ld Clk data shifts as needed for normal Yn computation.

If Rotate Right goes active after Compute Enable, one input of Nand 64 falls passing a disabling condition to 61 causing Q1 to drop at next Ld Clk. Q0 remains high, initiating an extra non-computing state, "01". In this state, output of And 63 is high passing a disabling input to Flip-Flop 60 via Nor 67. At the same time Nand 64 is disabled, so that at next Ld Clk Q0 will drop but Q1 will return to high, thus initiating a normal non-compute state. At this time, D inputs to both 60 and 61 become active, so that at next Ld Clk both Q0 and Q1 become high, permitting another Yn computation. As expected, this computation is preceded by one additional data load shift action so that data is effectively shifted right 3 tap positions while the coefficients have been shifted right one position; i.e. the data is displaced by the normal amount of two positions relative to the coefficients.

If "compute enable" is followed by neither "Rotate Right" nor "No Shift" (i.e. an implicit "Rotate Left"), D inputs of both 60 and 61 are immediately prepared so that at next Ld Clk, both Q0 and Q1 remain high and "compute enable" remains active. Thus, another Yn computation is performed before any further data shifts; i.e. after data has shifted right one position and coefficients have shifted left one tap, for a net relative shift of two positions as needed.

The state diagram of FIG. 5 provides a high level illustration of the foregoing state sequences of the logic of FIG. 3. The oval for "Load and Compute" (state 11) links to the oval for a normal "Data Load Op" (state 10), when "No Shift" follows Ld Clk. State 10 has a return link to state 11 at next Ld Clk, so that two data samples are shifted into the compute network for each normal Load and Compute action in which coefficients are not shifted.

State 11 links to the "Extra Load Op" (state 01) when Ld Clk and "Rotate Right" occur. In turn, state 01 links to state 10 at the next Ld Clk, and state 10 links to state 11 at the following Ld Clk. Thus, after each right tap rotation of coefficients 3 data samples are shifted into the computation network before the next Yn computation; for an effective shift of data two positions relative to coefficients.

Finally, State 11 links to itself when Rotate Left follows a Yn computation.

While we have shown and described our invention with reference to a specific preferred embodiment, it will be understood that those skilled in the art will be able to devise various arrangements embodying the principles of the invention without departing from the spirit and scope of inventive teachings herein. For example, it should be recognized that the invention may be applied to either pass band or base band equalization, with complex and/or real coefficients and data samples. Further variations are contemplated in numbers of taps in the computation network, tap spacings, sampling rates, etc.

The reference tap toward which coefficients are correctively shifted may be either symmetrically centered or offset from a center position depending on characteristics of the communication channel being equalized, and the technique for determining when a shift is required may differ from that presently described (reference 1 suggests several other methods of determining positions of symbol peaks within the equalizer). Furthermore it should be understood that coefficient monitoring for potential shifts is not required each time that the coefficients are updated, and it is not necessary to perform either of these functions at the symbol sampling/loading rate notwithstanding the suggestion of such in FIG. 4.

Furthermore, those skilled in the art will appreciate that since both lattice and recursive filters can be implemented in tapped delay networks or FIR filters suitably interconnected, present concepts may be adapted to extend to adaptive filters of either lattice or recursive form using straightforward conversion techniques (Reference 3 above, pages 40–43, illustrates implementation of recursive filters using tapped delay lines, and Reference 4 pages 93–98, describes a process for converting between lattice and multiple tapped delay line filter structures).

Finally, while the disclosed preferred embodiment has focused applicationally on an adaptive equalizer for voice band modem reception, it will be readily recognized by those skilled in the art that similar principles may be applied to other applications with like requirements. Reference 10, for instance, indicates other applications for adaptive filtering to which the present technique of relative shifting of information flow and computation activities may apply.

We claim

1. A modem receive section comprising:
   a source of fixed rate clock pulses for loading sampled signals which represent information quantized as analog amplitude signals; said information being asynchronous relative to said clock pulses;
   a fractional tap spacing equalizer for processing said sampled signals in time coordination with said clock pulses; said equalizer having an optimized ensemble of coefficients positioned at a number of computing taps arranged about a reference tap and having optimized relative to said reference tap; said coefficients being used in computations involving said sampled signals; and
   means coupled to said equalizer for correcting for misalignment of said coefficients relative to said reference tap due to relative drift between transmissions representing said analog amplitude and said fixed rate clock pulses.

2. A modem receive section in accordance with claim 1 wherein said means to correct for misalignment comprises:
   means for monitoring said coefficients for misalignment relative to said reference tap, and for generating "rotate right" or "rotate left" control signals when such misalignment is detected; said "rotate right" signal being generated when a most significant coefficient is found to be positioned to the left of the reference tap and said "rotate left" signal being issued when said most significant coefficient is to the right of the reference tap; and
   means activated when either said "rotate right" or "rotate left" signal issued for modifying the phase of the equalizer computation relative to the loading of new samples into the equalizer in order to correct for distortional effects in the output of the equalizer which would occur if said computation phase were not modified.

3. A modem receiver section in accordance with claim 2 wherein said phase modifying means comprises:
   means responsive to a said "rotate right" signal for retarding the time of occurrence of said computation to allow for loading of an additional sample into said equalizer; and
   means responsive to a said "rotate left" signal to advance said computation before any new sample can be loaded into said equalizer.

4. A modem receiver section in accordance with claim 2 wherein said monitoring means comprises:
   first circuit means coupled to computing taps to the left of said reference tap for comparing successive coefficients in pairs beginning with a leftmost pair, and progressively passing the large coefficient of each pair to the right as one coefficient of the next pair to be compared and selectively passed to the right;
   second circuit means coupled to computing taps to the right of said reference tap for comparing successive coefficients in pairs beginning with a rightmost pair and progressively passing the larger coefficient of each pair to the left as one coefficient of the next pair to be compared and selectively passed to the left; and
   3-way compare circuit means for comparing magnitudes of final outputs of the first and second circuit means with the magnitude of the coefficient currently located at the reference tap; said compare circuit means producing a said "rotate right" control signal if the magnitude of the first circuit means final output is the largest of the compared magnitudes and producting a said "rotate left" control signal if the magnitude of the second circuit means final output is the largest of the compared magnitudes and producing a "no shift" control signal if the magnitude of the center coefficient is the largest of the compared magnitudes.

5. A method of maintaining synchronization between a fractional tap spacing equalizer in a modem receiver and transmitted data comprising:
   sampling said data signals at a fixed rate corresponding to the baud rate of symbol transmission but relatively asynchronous to the timing phase of said symbols;
   storing said samples in first in first out mode in a first shifting network;

storing coefficients for fractional tap spacing equalization computation in a second shifting network; said coefficients having a most significant coefficient located at a reference tap of said network;

responsive to loading of new data samples into said first network, computing equalized data signals from data samples and coefficients stored at corresponding tap positions in said first and second shifting networks, and updating coefficient magnitudes based on equalized data signals computed;

monitoring said coefficients after a predetermined number of computing steps, to determine when the most significant coefficient has drifted either to the left or right of said reference tap due to the asynchronism between said sampling rate and said transmission baud rate; and responsive to a determination that said most significant coefficient has drifted, correcting for said drift by shifting said coefficients in a direction opposite to that of the detected drift.

6. The synchronizing method of claim 5 wherein said correcting step includes a further step of:

modifying the timing of said computing step relative to the loading of new data into said first storage network to correct for distortions in equalized data which would otherwise occur without such phase modifying action.

7. The method of claim 6 wherein said phase modifying step comprises:

retarding the timing of said computing step when the direction of correctional shifting of said coefficients is the same as the direction of shifting of data samples through said first network; whereby more samples are shifted into the first network between the computation preceding a coefficient shift and the next computation than would normally be shifted into said first network between successive computations; and advancing the timing of said computation when the direction of coefficient shifting is opposite to that of data in said first network; whereby fewer samples are shifted into the first network between the computation preceding the coefficient shift and the next computation.

8. The method of claim 5 wherein said reference tap is located at a center position within the equalizer.

9. An adaptive filter arrangement comprising:

a source of sampled signals which represent quantized analog amplitudes;

a source of clock pulses for loading said sampled signals at a fixed rate;

a tapped delay network for performing filtering computation functions on said sampled signals;

means coupled to said network for supplying coefficients for said computations; said coefficients arranged in an optimal configuration relative to a reference tap in said network;

means coupled to said network for monitoring said coefficients to detect misalignment of said coefficients relative to said reference tap;

means coupled to said detecting means for correcting for detected misalignment by shifting said coefficients relative to said reference tap in a direction tending to reduce said misalignment; and means responsive to said coefficient shifts for modifying the timing of said filtering computation functions to adjust for distortional effects which otherwise would result from said shifts.

* * * * *